(12) United States Patent
Ueda et al.

(10) Patent No.: US 6,738,014 B2
(45) Date of Patent: *May 18, 2004

(54) MONITORING CENTER AND SERVICE SYSTEM OF AIR CONDITIONER

(75) Inventors: Hiroyuki Ueda, Shimizu (JP); Keiji Satou, Fujikawa (JP); Masamichi Mochizuki, Fujinomiya (JP); Tatsuya Sugiyama, Shizuoka (JP)

(73) Assignee: Hitachi, Ltd., Tokyo (JP); Trustee for the Benefit of Hitachi Air Conditioning Systems Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 09/996,992

(22) Filed: Nov. 30, 2001

(65) Prior Publication Data

US 2002/0154057 A1 Oct. 24, 2002

(30) Foreign Application Priority Data

Apr. 20, 2001 (JP) ........................................ 2001-122016

(51) Int. Cl.$^7$ .............................. G01S 5/02; H04B 7/185
(52) U.S. Cl. ............................... 342/357.09; 342/357.1; 701/213
(58) Field of Search ..................... 342/357.09, 357.1, 342/357.06; 701/213

(56) References Cited

U.S. PATENT DOCUMENTS 6,483,906 B1 * 11/2002 Iggulden et al. ....... 379/102.03

FOREIGN PATENT DOCUMENTS

| JP | 09-332267 | 12/1997 |
| JP | 11-312131 | 11/1999 |

* cited by examiner

Primary Examiner—Theodore M. Blum
(74) Attorney, Agent, or Firm—Antoneli, Terry, Stout & Kraus, LLP (57) ABSTRACT

In a service system of an air conditioner connected through a network to a monitoring center, the air conditioner receives radio wave transmitted from a GPS satellite to transmit information of the received radio wave and a manufacturer's serial number on the air conditioner to the monitoring center and the monitoring center performs service of the air conditioner on the basis of the received information and the serial number. The service system of the air conditioner can perform service, update or renewal, maintenance and the like of an air conditioner more correctly and exactly and attain speedup thereof.

10 Claims, 6 Drawing Sheets

CUSTOMER'S NAME : ○○ AIR SYSTEM
ADDRESS : 390, ─────
SPECIAL AGENT : ******
DELIVERY DATE : APRIL 2001

SYSTEM CONFIGURATION DIAGRAM

| SERIAL NUMBER | TYPE OF OUTSIDE UNIT | SYSTEM | ADDRESS | TYPE OF INSIDE UNIT | OPTION SET | ALARM HISTORY | SOFTWARE VERSION |
|---|---|---|---|---|---|---|---|
| U4AA0000 | RAS-J560FS1 | 0 | | | DEMAND | 3 | P1200 |
| | | | 0 | RCI-J224K1 | | 2 | P1234 |
| | | | 1 | RCI-J112K1 | | 0 | ▓▓▓▓ |
| | | | 2 | RCI-J112K1 | | 0 | P1234 |

* COLORED SOFTWARE VERSION IS NOT LATEST VERSION

FIG. 7

CUSTOMER'S NAME : ○○ AIR SYSTEM
ADDRESS : 390, ——————
SPECIAL AGENT : *******
DELIVERY DATE : APRIL 2001

ALARM HISTORY

| ALARM CODE | OCCURRENCE DATE |
|---|---|
| 03 | 2001 / 04 / 01  12 : 00 |
| 02 | 2001 / 04 / 02  13 : 11 |
| 51 | 2001 / 04 / 10  23 : 59 |

MONITORING CENTER AND SERVICE SYSTEM OF AIR CONDITIONER

BACKGROUND OF THE INVENTION

The present invention relates to a service system for performing maintenance, inspection, monitoring of operation and the like of an air conditioner and more particularly to a service system suitable for update of a program, setting of calendar data and the like.

Heretofore, JP-B2-2926282 (JP-A-4-359741) discloses that an operation control program for an air conditioner is stored in a concentrated controller and the controller transmits the operation control program through a communication line to an outside unit and an inside unit to update an old one and JP-A-9-79654 discloses utilization of a network.

Further, JP-A-11-230602, for example, discloses that an operation state of an air conditioner is monitored and its monitored information is stored in the HTML file format to provide the information onto the Internet, so that diagnosis of a failure and treatment upon occurrence of anything unusual are made quickly.

Recently, systematization and distribution with individualization of air conditioner are advanced and the air conditioner becomes more complex so that, for example, a lot of air conditioning units are used within a single building. Service of an air conditioner, particularly, speedup of update or renewal and maintenance, transmission of information therefor, communication of information and the like are more required.

SUMMARY OF THE INVENTION

It is an object of the present invention to provide a service system of an air conditioner for performing service, update or renewal, maintenance and the like of an air conditioner more correctly and exactly and attaining speedup thereof.

In order to achieve the above object, according to the present invention, in a service system of an air conditioner connected through a network to a monitoring center, the air conditioner receives radio wave transmitted from a GPS satellite to transmit information of the received radio wave and a manufacturer's serial number on the air conditioner to the monitoring center and the monitoring center performs service of the air conditioner on the basis of the information and the serial number.

Further, according to the present invention, a service system of an air conditioner for performing maintenance and management of the air conditioner from a monitoring center, comprises a concentrated controller connected to the air conditioner and receiving radio wave transmitted from a GPS satellite to calculate its own position, and the concentrated controller transmits the calculated own position and a manufacturer's serial number on the air conditioner to the monitoring center and the monitoring center identifies a control program required for the air conditioner on the basis of its own position and the serial number on the air conditioner to transmit the control program to the concentrated controller, the concentrated controller loading the received control program into the air conditioner.

Further, in addition to the above, it is desirable that when anything unusual occurs in the air conditioner, the received information and the serial number are transmitted to the monitoring center.

Further, in addition to the above, it is desirable that the received information and the serial number is transmitted to the monitoring center in response to a request from the monitoring center.

Further, in addition to the above, it is desirable that ground wave is utilized to calculate a position of the air conditioner.

Further, in addition to the above, it is desirable that the concentrated controller stores the control program and rewrites the control program when the air conditioner stops its operation.

Further, according to the present invention, a monitoring center connected through the Internet to an air conditioner and a terminal unit, receives information of radio wave transmitted from a GPS satellite and received by the air conditioner and a manufacturer's serial number on the air conditioner, prepares a home page on the basis of the information and the serial number, and makes it possible to read the home page from the air conditioner and the terminal unit.

Further, in addition to the above, it is desirable that the terminal unit is a portable terminal which can display character information and map information.

Further, according to the present invention, an air conditioner used in a service system of an air conditioner, receives radio wave transmitted from a GPS satellite and transmits the received information and a manufacturer's serial number on the air conditioner through a network.

Further, in addition to the above, it is desirable that an air conditioner generates a time signal on the basis of the received information and synchronizes its own clock with the time signal.

DESCRIPTION OF THE EMBODIMENTS

An embodiment according to the present invention is now described with reference to the accompanying drawings.

Figure 1:
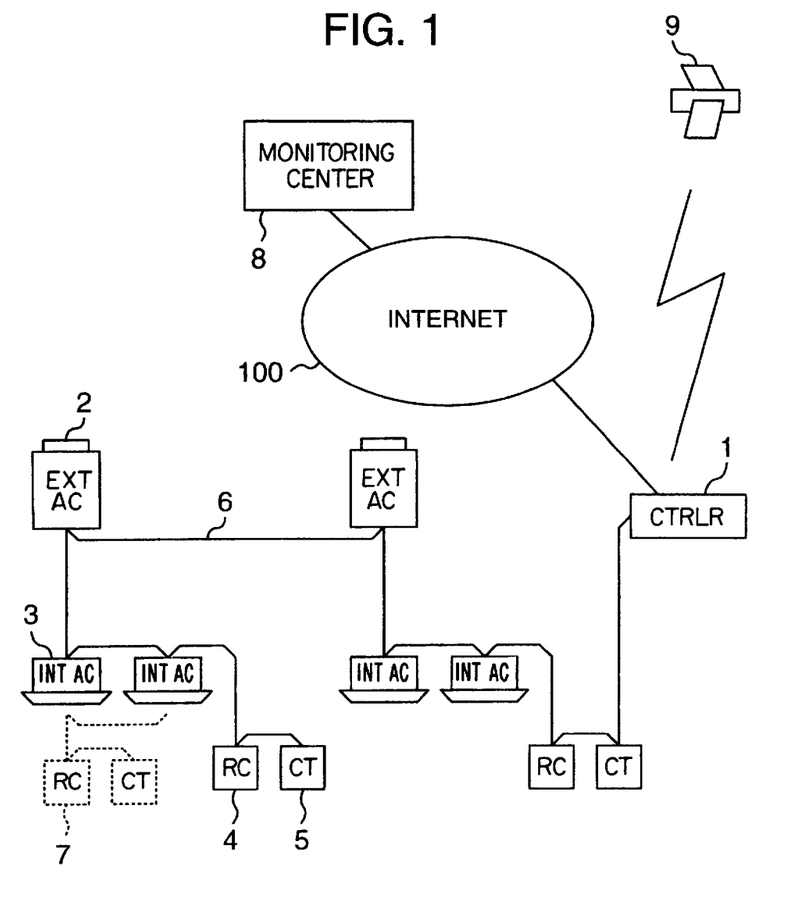
FIG. 1 is a block diagram schematically illustrating a service system of an air conditioner according to an embodiment of the present invention.

FIG. 1 is a schematic diagram illustrating the whole of a service system of an air conditioner. In FIG. 1, numeral 2 denotes an outside unit of the air conditioner. The outside unit 2 is connected through a communication line 6 to an inside unit 3, a remote controller 4, and a control timer 5 which are constituent units of the air conditioner. The air conditioner or its concentrated controller 1 is connected through the Internet 100 to a monitoring center 8 (base station) constituting a Web server.

Moreover, the air conditioner or its concentrated controller 1 can receive radio wave transmitted by a geodetic satellite launched by the Department of Defense of the United States for the purpose of GPS and ground wave of a radio wave band for portable telephone for constructing DGPS and understand a position (longitude/latitude) on the earth where the wave is received on the basis of information of the received wave.

Figure 2:
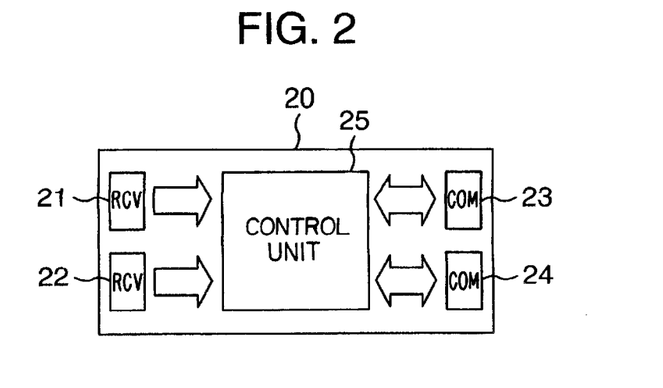
FIG. 2 is a block diagram schematically illustrating a concentrated controller used in the service system of the air conditioner according to an embodiment of the present invention.

FIG. 2 is a functional block diagram of the concentrated controller 1. The concentrated controller manages the inside units in groups and controls operation/stop mode, setting of temperature, air quantity, setting of automatic louver, display of alarm code upon occurrence of anything unusual and the like. The control timer 5 is used together with the concentrated controller 1 to set a scheduled operation in a unit of week.

The concentrated controller 1 comprises GPS receiving means 22 having an antenna module and the like for receiving radio wave transmitted from a GPS satellite 9, control means 25 for performing calculation of the longitude and the latitude based on the received information, storing, data conversion, editing and the like, communication-with-air-conditioner means 23 for communicating with the outside unit 2 and the inside unit 3 to transmit and receive operation data, set data, machine type data containing manufacturer's serial numbers on air conditioners and the like, and communication means 24 for transmitting and receiving data from the monitoring center 8. The communication means 24 is desirable connected to the Internet 100 by means of radio communication. Further, the concentrated controller 1 further includes standard radio wave receiving means 21 for receiving radio wave for a new long wave (JJY) broadcasting transmitted from the Communications Research Laboratory of the Ministry of Posts and Telecommunications.

The air conditioner has a refrigerating system number and a group number determined upon system design. The concentrated controller 1 reads manufacturer's serial numbers on the inside unit 3 and the outside unit 2 and transmits information of received radio wave transmitted from the GPS satellite through the Internet to the monitoring center 8 or calculates the longitude and the latitude of a place where the radio wave is received to transmit the calculated longitude and latitude through the Internet to the monitoring center 8. The monitoring center 8 prepares a home page on the basis of these information items to be constituted as a Web server. Accordingly, when a terminal unit such as a personal computer and a portable telephone is connected to the Internet, the type of an air conditioner can be identified from an installed place and a manufacturer's serial number of the air conditioner and data concerning a special agent and a delivery time of the air conditioner and a system configuration drawing of a system delivered to a customer can be further prepared from a database for delivery slips of the monitoring center 8 to treat maintenance, repair and the like individually and quickly.

Further, version numbers of software, history information of trouble and the like are transmitted to the monitoring center 8 together with operation data as information transmitted to the monitoring center except the manufacturer's serial numbers and the positional data and can be managed in the monitoring center 8 collectively.

Figure 3:
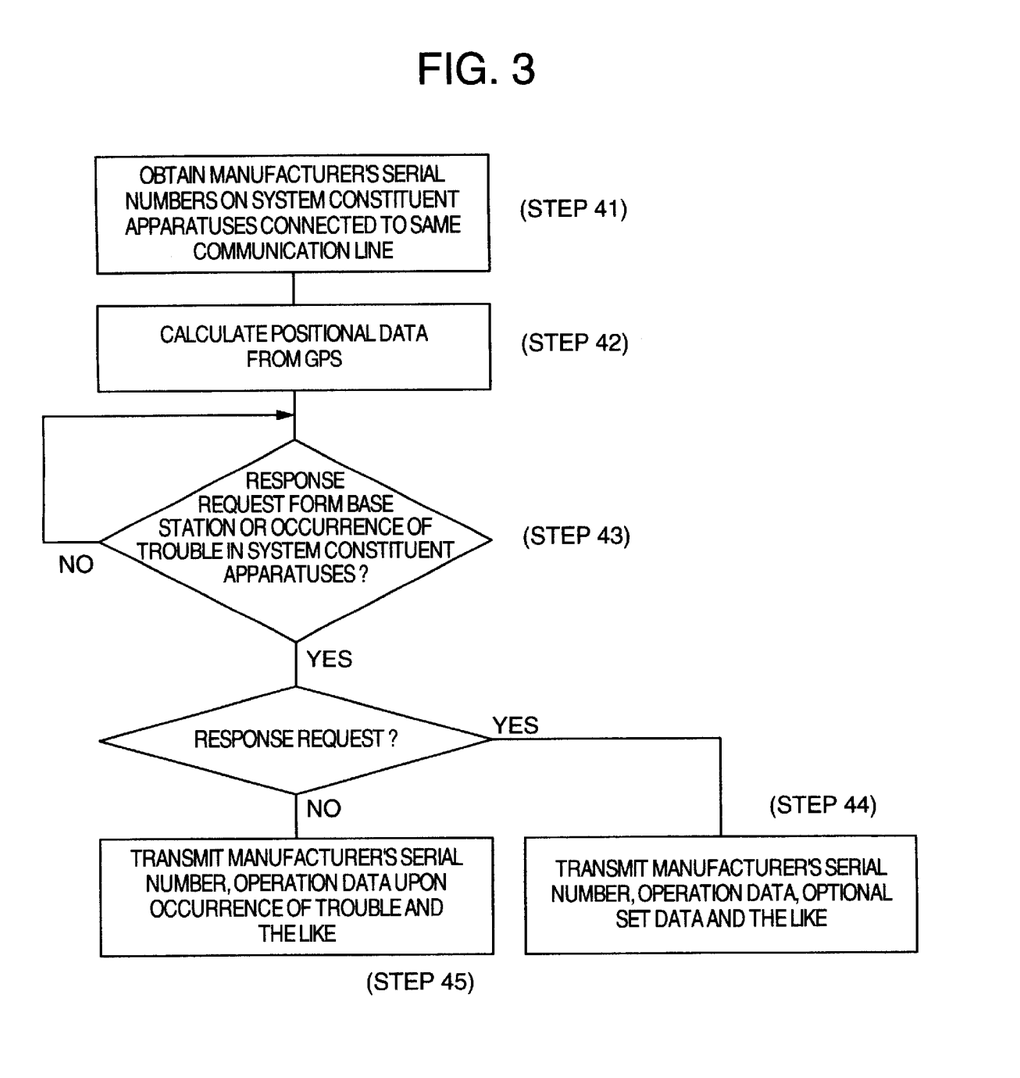
FIG. 3 is a flow chart showing data processing according to an embodiment of the present invention.

FIG. 3 is a flow chart showing data processing. The concentrated controller 1 obtains or collects the manufacturer's serial numbers on the inside unit 3 and the outside unit 2 from a message transmitted to and received from the inside unit 3 and the outside unit 2 (step 41). Then, a position of the concentrated controller 1 is calculated from information received by the GPS receiving means 22 (step 42). When this position information is supplied to a map retrieval system or the like, a place thereof can be understood in detail and when reference is made to a customer database in which customer information is stored, type information of air conditioners related to customers and apparatus information database in which system configuration is stored, a system configuration of an air conditioner can be retrieved and displayed immediately.

The concentrated controller 1 monitors a response request from the monitoring center 8 and whether any alarm or trouble such as anything unusual occurs in the air conditioner (step 43). For example, when a response request message is received from the monitoring center 8, operation data, optional set data and the like are transmitted to the monitoring center 8 (step 44). Further, when the concentrated controller 1 detects any alarm or trouble occurred in any constituent apparatus of the air conditioner, the concentrated controller 1 transmits the manufacturer's serial number, operation data upon occurrence of the alarm or trouble and the like to the monitoring center 8 (step 45). Further, these data transmitted may be previously determined to make it possible to treat a wide range of uses.

As described above, place information, system configuration information, a manufacturer's serial number on each system constituent apparatus of the concentrated controller, and operation data of the air conditioner (for example, temperature and pressure of main portion during refrigeration cycle such as suction pressure, discharge pressure, suction temperature, discharge temperature, expansion valve openings of outside unit and inside unit, compressor current value, compressor frequency, outside air temperature, evaporation temperature, inlet temperature, outlet temperature, freezing temperature, request frequency, gas tube temperature, set temperature and the like) are collected remotely to be recorded in a database.

Figure 4:
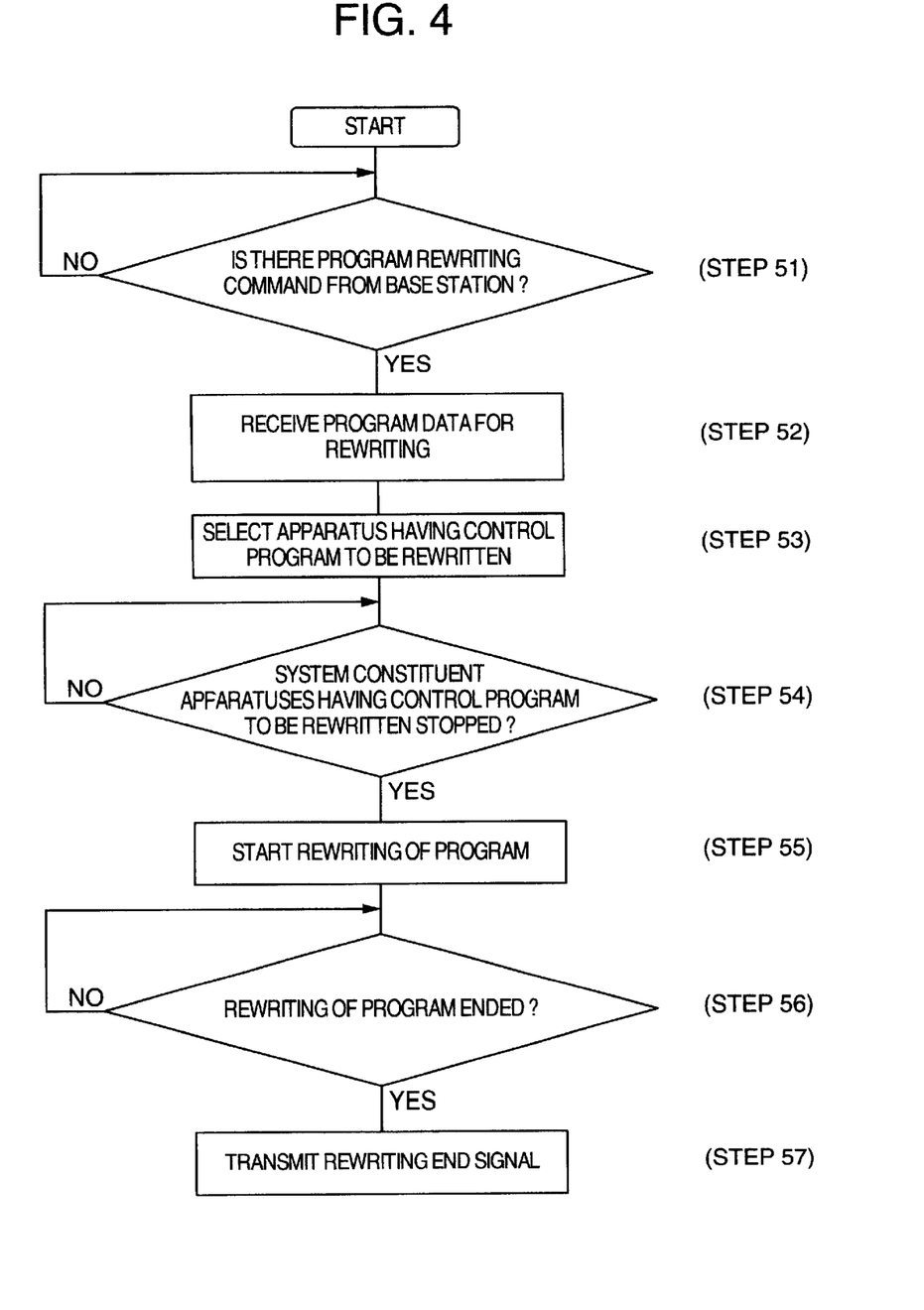
FIG. 4 is a flow chart showing data processing for rewriting a control program in response to update of the version of thereof according to an embodiment.

FIG. 4 is a flow chart showing data processing for rewriting a control program in response to update of the version of thereof, which is one of services of the air conditioner. The control means 25 of the concentrated controller 1 always monitors from a communication message whether there is a program rewriting command from the monitoring center 8 (base station) or not (step 51). At this time, the monitoring center 8 relates a control program to be rewritten to a manufacturer's serial number on an air condition and sets an individual or collective identification code to a header portion of the message, for example.

Then, the concentrated controller 1 receives program data transmitted from the monitoring center 8 and stores the data in non-volatile memory means temporarily (step 52). When a rewriting command is received from the monitoring center 8, whether apparatuses having the control program to be rewritten (outside unit 2, inside unit 3 and the like) have specific manufacturer's serial numbers or the control programs for the apparatuses are rewritten collectively is recognized to select an apparatus (step 53). When the program is rewritten, there is a possibility that anything unusual occurs in operation of the apparatuses if the apparatuses are in operation and accordingly it is judged whether the apparatuses are stopped or not before the rewriting operation (step 54). When the apparatus having the program desired to be rewritten is stopped, rewriting is started by means of communication (step 55).

When a collectively rewriting command is issued, an apparatus being in suspension or stopped state is searched for and rewriting operation is started from the apparatus to reduce a rewriting time. At this time, the control means 25 utilizes a flag to manage the rewriting operation in order to prevent double rewriting. When the rewriting operation is ended (step 56), an end signal containing the serial number of the apparatus having the program rewritten is transmitted to the monitoring center 8 (step 57). The end signal containing the serial number is managed in the monitoring center 8 to prevent double rewriting in both of the monitoring center 8 and the concentrated controller 1. Furthermore, when there are provided a mode that an air conditioner is forcedly stopped from the monitoring center 8 and comes into rewriting operation immediately and a mode that utilization state of a customer is monitored and rewriting operation is started when an operation stop command is issued, operation can be switched more flexibly.

In order to reduce a communication traffic between the monitoring center 8 and the concentrated controller 1 greatly, the concentrated controller 1 is required to include non-volatile memory means having a sufficient capacity and to store programs for several kinds of apparatuses.

Figure 6:
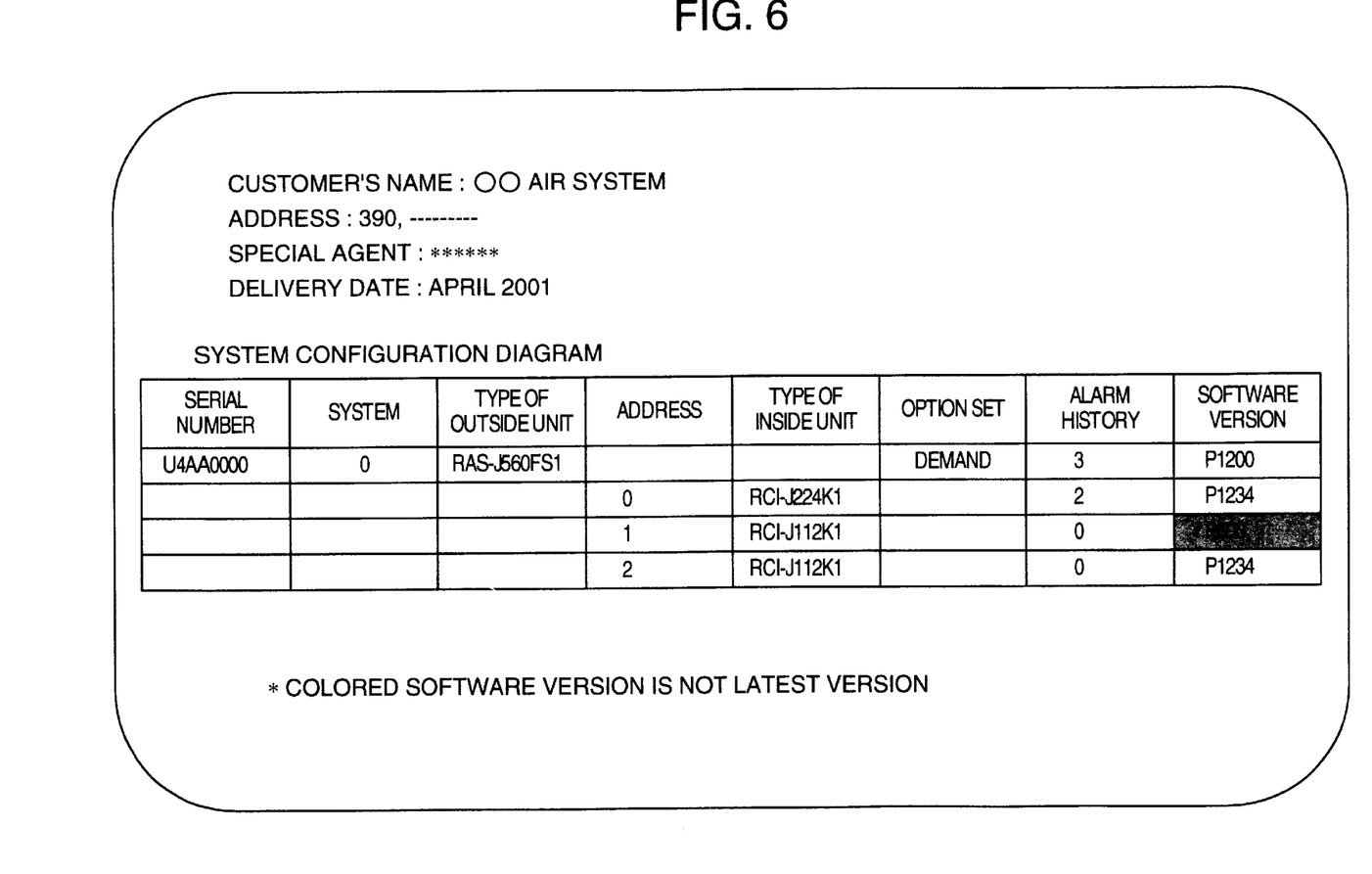
FIG. 6 shows a picture of a home page relating to rewriting of the control program according to an embodiment.

FIG. 6 shows a picture of a home page provided by the monitoring center 8 when the control program is rewritten. Customer's name and address, a special agent's name and delivery date of an air conditioner are shown in the upper portion of the picture and a serial number on the air conditioner, a refrigerating system, type of an outside unit, type of an inside unit connected to the outside unit, address thereof, option set, alarm history indicative of the number of times of alarms produced, and version number of the control program of outside and inside units are shown in the lower portion thereof.

In this connection, the customer's name and address are linked with map data and display of a map and when the customer's name or address is clicked by a mouse, a map relative to the customer's name or address is displayed.

Figure 7:
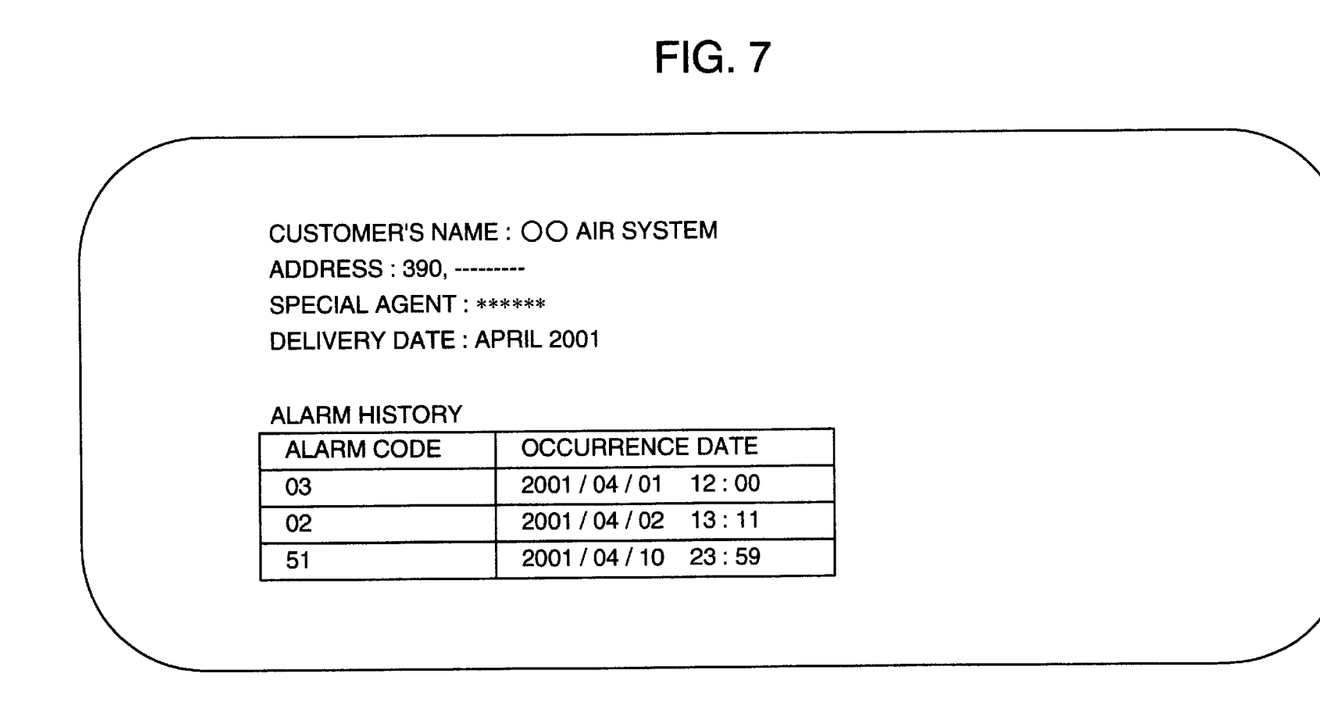
FIG. 7 is a picture of a home page showing detailed alarm history according to an embodiment.

The alarm history is linked with a picture indicative of detail information as shown in FIG. 7 and when the alarm history shown in FIG. 6 is clicked, the picture is switched to FIG. 7. In FIG. 7, a list of alarm codes and occurrence data of alarms can be viewed as the alarm history. It is desirable that whether software versions of the customer's apparatuses are newest or not is examined and whether the software must be rewritten or not can be confirmed by means of coloring or turning-on-and-off on the picture shown in FIG. 6 so that an apparatus having the software to be rewritten is selected on the picture to thereby rewrite the software of the selected apparatus.

Moreover, the monitoring center 8 transmits a data collection mode signal to an air conditioner to thereby monitor operation data continuously and transmits a trigger mode signal to thereby collect data within a set time buffer cyclically until an alarm occurs, so that the collected data are used for judgment as to whether the air conditioner is good or bad.

In the foregoing description, since the air conditioner or the concentrated controller 1 receives radio wave transmitted from the GPS satellite and services such as maintenance, monitoring and the like relating to the air conditioner are performed on the basis of the information of the radio wave and the serial number on the air conditioner, the air conditioner can be managed exactly even when the air conditioner is moved after installation, even when it is not understood where the air conditioner is installed, even when a system scale of the air conditioner is small because of installation in a small-scale store, and even when an air conditioner is a large-scale building multi-system.

Next, setting of calendar data is described as the service of the air conditioner. When only setting of calendar data or only synchronization with the standard time is made, only the standard radio wave receiving unit 21 for receiving radio wave of the new long wave (JJY) broadcasting transmitted from the Communications Research Laboratory of the Ministry of Posts and Telecommunications is required to be utilized instead of reception of radio wave transmitted from the GPS satellite 9.

Figure 5:
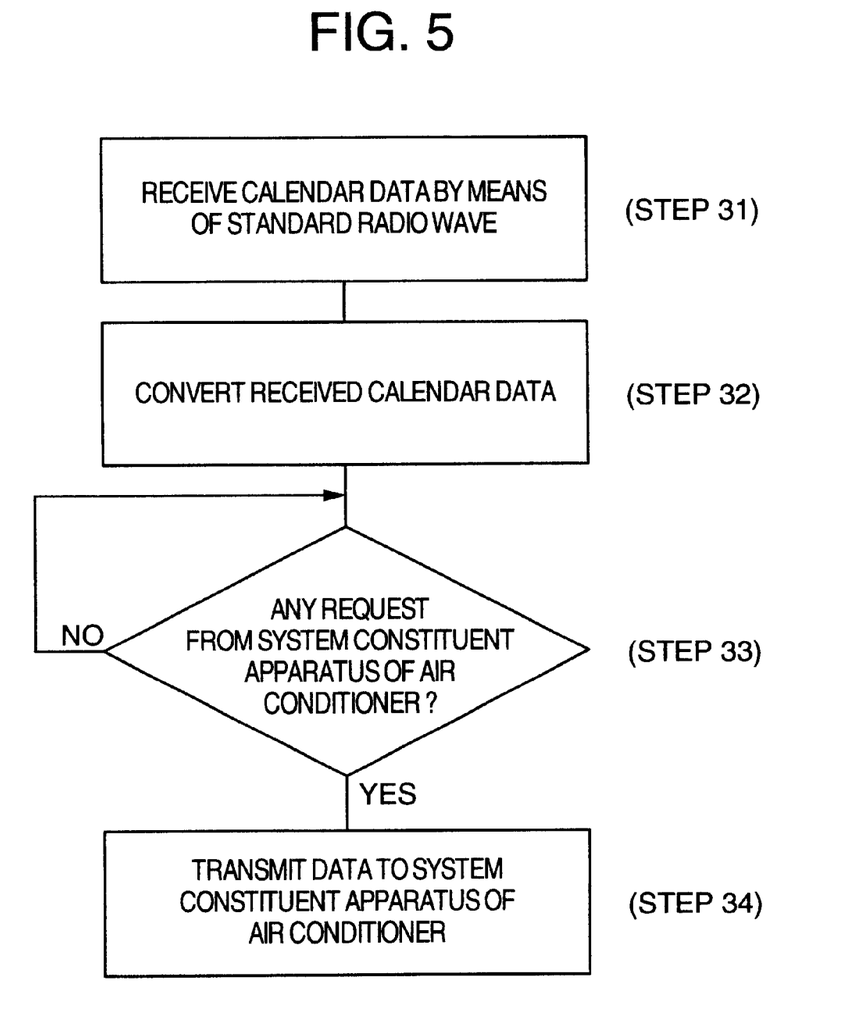
FIG. 5 is a flow chart showing data processing for setting calendar data according to an embodiment.

FIG. 5 is a flow chart showing data processing for setting calendar data. First, data received (step 31) by the standard radio wave receiving means 21 is converted into transmission data capable of being recognized by the air conditioner (step 32). Thereafter, the data is transmitted to system constituent apparatuses of the air conditioner such as the control timer 5 using the calendar data (step 34). The system constituent apparatus of the air conditioner which has received the data updates its own calendar data. In this example, by requiring the calendar data to the concentrated controller 1 upon turning on of a power supply of the air conditioner or the constituent apparatus or at intervals of previously set time, it is possible to suppress increase of traffic on the communication line. The request for the calendar data can be made by the system constituent apparatuses other than the concentrated controller 1. Further, since the calendar data can be automatically updated, it is possible not only to exclude manual setting of the calendar data but also update the calendar data without a backup battery upon recovery from power failure or update the calendar data with no error periodically.

As described above, according to the present invention, there can obtain a service system of an air conditioner for performing service, update or renewal, maintenance and the like of an air conditioner more correctly and exactly and attaining speedup thereof.

What is claimed is:

1. A service system of an air conditioner connected through a network to a monitoring center; wherein
    said air conditioner receives a radio wave transmitted from a GPS satellite and transmits information obtained by calculating position data on a reception position of said radio wave and transmits a manufacturer's serial number of said air conditioner to said monitoring center,
    wherein said monitoring center identifies, from said calculated position information, an installed location of said air conditioner, and also identifies, from said serial number, a machine type of said air conditioner to permit a service of said air conditioner to be performed.

2. A service system of an air conditioner for performing maintenance and management of said air conditioner from a monitoring center, comprising:
    a concentrated controller connected to said air conditioner to receive a radio wave transmitted from a GPS satellite to calculate position data on a position of said concentrated controller;
    wherein said concentrated controller transmits to said monitoring center said calculated position data and a manufacturer's serial number of said air conditioner,
    said monitoring center identifies, from said position data, an installed location of said air conditioner and also identifies, from said serial number, a machine type of said air conditioner, and transmits a control program required for said air conditioner to said concentrated controller, and
    said concentrated controller loads said received control program into said air conditioner.

3. The service system according to claim 1, wherein when anything unusual occurs in said air conditioner, said received position data and said serial number are transmitted to said monitoring center.

4. The service system according to claim 1, wherein said position data and said serial number are transmitted to said monitoring center in response to a request from said monitoring center.

5. The service system according to claim 1, wherein said air conditioner further receives a ground wave of a radio wave band for portable telephones, and information of the received ground wave and the radio wave transmitted from said GPS satellites are used to calculate a position of reception of said radio wave.

6. The service system according to claim 2, wherein said concentrated controller stores said received control program and rewrites the control program of said air conditioner based on said received control program when said air conditioner stops its operation.

7. A monitoring system connected through the Internet to an air conditioner and a terminal unit, comprising:

a monitoring unit to prepare a home page based on information of position data and a manufacturer's serial number of said air conditioner so as to be accessible from a location of said air conditioner as well as from said terminal unit so as to permit an operation monitoring service to be carried out, wherein said air conditioner receives a radio wave transmitted from a GPS satellite and calculates said information on said position data using said radio wave.

8. The monitoring system according to claim 7, wherein said terminal unit is a portable terminal which can display character information and map information.

9. An air conditioner for use in an air conditioner service system, comprising:

a receiver to receive a radio wave transmitted from a GPS satellite; and a transmitter to transmit information obtained by calculating data of a position of reception of said radio waves and a manufacturer's serial number of said air conditioner through a network to a monitoring center, so that an installed position of said air conditioner is identified by said position data and a machine type of said air conditioner is identified by said serial number, so as to permit an operation monitoring service to be executed.

10. The air conditioner according to claim 9, comprising a time extractor to extract a time signal from information received from said GPS satellite to synchronize an internal clock with said time signal.

* * * * *

UNITED STATES PATENT AND TRADEMARK OFFICE
CERTIFICATE OF CORRECTION

| | | |
|---|---|---|
| PATENT NO. | : 6,738,014 B2 | Page 1 of 1 |
| APPLICATION NO. | : 09/996992 | |
| DATED | : May 18, 2004 | |
| INVENTOR(S) | : Ueda et al. | |

It is certified that error appears in the above-identified patent and that said Letters Patent is hereby corrected as shown below:

On Title Page, please delete the second paragraph in Section (*) which states:

This patent is subject to a terminal disclaimer.

Signed and Sealed this

Twenty-third Day of October, 2007

JON W. DUDAS
*Director of the United States Patent and Trademark Office*